US008572023B2

(12) United States Patent
Resende, Jr. et al.

(10) Patent No.: US 8,572,023 B2
(45) Date of Patent: *Oct. 29, 2013

(54) DATA SERVICES FRAMEWORK WORKFLOW PROCESSING

(75) Inventors: Paulo Resende, Jr., Ewing, NJ (US); Gafar F. Lawal, Woodinville, WA (US); James R. McGovern, Chatham, NJ (US); Suresh G. Nair, Robbinsville, NJ (US); Kumar Vadaparty, Bellemead, NJ (US)

(73) Assignee: Bank of America Corporation, Charlotte, NC (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/760,438

(22) Filed: Apr. 14, 2010

(65) Prior Publication Data

US 2011/0258158 A1  Oct. 20, 2011

(51) Int. Cl.
*G06F 17/30* (2006.01)

(52) U.S. Cl.
USPC .......................................... 707/608; 707/609

(58) Field of Classification Search
USPC .................................. 707/802, 803, 608, 609
See application file for complete search history.

(56) References Cited

U.S. PATENT DOCUMENTS

| 6,604,143 | B1 | 8/2003 | Nagar et al. .................. 709/229 |
| 7,194,529 | B2 * | 3/2007 | Kupiec et al. ................. 709/223 |
| 7,865,931 | B1 | 1/2011 | Stone et al. ........................ 726/1 |
| 7,913,300 | B1 | 3/2011 | Flank et al. ..................... 726/12 |
| 2003/0004744 | A1 | 1/2003 | Greene et al. |
| 2003/0197733 | A1 | 10/2003 | Beauchamp et al. |
| 2004/0254881 | A1 | 12/2004 | Kumar et al. |
| 2005/0005259 | A1 | 1/2005 | Avery et al. |
| 2005/0152302 | A1 * | 7/2005 | Takahashi et al. ............. 370/321 |
| 2006/0206890 | A1 * | 9/2006 | Shenfield et al. .............. 717/174 |
| 2007/0079282 | A1 | 4/2007 | Nachnani et al. |
| 2007/0288890 | A1 * | 12/2007 | Wells .............................. 717/113 |
| 2008/0052102 | A1 | 2/2008 | Taneja et al. |
| 2008/0263009 | A1 | 10/2008 | Buettner et al. |
| 2010/0048242 | A1 | 2/2010 | Rhoads et al. |
| 2011/0191308 | A1 * | 8/2011 | Lowry et al. .................. 707/705 |

OTHER PUBLICATIONS

PCT Notification of Transmittal of the International Search Report and the Written Opinion of the International Searching Authority, or the Declaration with attached International search Report and the Written Opinion of the International Searching Authority in International Application No. PCT/US 11/27810, dated May 4, 2011, 9 pages.

Pending U.S. Appl. No. 12/760,495 entitled *Data Services Framework Visibility Component* in the name of Paulo Resende Jr., et al.; 35 total pages, filed Apr. 14, 2010.

(Continued)

*Primary Examiner* — Leslie Wong
*Assistant Examiner* — Fariborz Khoshnoodi
(74) *Attorney, Agent, or Firm* — Michael A. Springs

(57) ABSTRACT

A data services framework workflow processing system and method is disclosed. The method includes receiving a request for data from a client and based on the request, determining a workflow to process the request. The method also includes based on the workflow, generating a plurality of backend calls. Additionally, the method includes based on the plurality of backend calls, selecting one or more data sources from a plurality of data sources. The method also includes transmitting one or more of the plurality of backend calls to the selected data sources and receiving, from each the selected data sources, a response to the plurality of backend calls.

20 Claims, 4 Drawing Sheets

(56) References Cited

OTHER PUBLICATIONS

USPTO; Office Action for U.S. Appl. No. 12/760,495 in the name of Paulo Resende Jr., et al.; 12 pages, Jun. 21, 2012.

PCT Notification of Transmittal of the International Search Report and the Written Opinion of the International Searching Authority, or the Declaration with attached International Search Report and the Written Opinion of the International Searching Authority in the International Application No. PCT/US 11/28620, dated Jun. 9, 2011, 9 pages.

Resende, U.S. Appl. No. 12/760,495, Final Office Action from the US Patent and Trademark Office dated Oct. 25, 2012.

David Hollingsworth; *The Workflow Management Coalition Specification; The Workflow Reference Model*; TC00-1003; Issue 1.1; 55 pages, Jan. 19, 1995.

USPTO; Notice of Allowance and Fee(s) Due for U.S. Appl. No. 12/760,495 in the name of Paulo Resende Jr., et al.; 8 pages, Mar. 12, 2013.

* cited by examiner

FIG. 4

DATA SERVICES FRAMEWORK WORKFLOW PROCESSING

TECHNICAL FIELD OF THE INVENTION

The invention relates generally to data processing techniques, and more specifically to data services framework workflow processing.

BACKGROUND OF THE INVENTION

Systems and code underlying enterprise applications may be varied and unique. Data processing, storage, and retrieval may be unique for each application, each application may use its own business logic to determine backend call sequences. The application may apply specific validation rules to data retrieved from a data source.

SUMMARY OF THE INVENTION

In accordance with a particular embodiment of the present disclosure, method includes receiving a request for data from a client and based on the request, determining a workflow to process the request. The method also includes based on the workflow, generating a plurality of backend calls and based on the plurality of backend calls, selecting one or more data sources from a plurality of data sources. Additionally, the method includes transmitting one or more of the plurality of backend calls to the selected data sources and receiving, from each the selected data sources, a response to the plurality of backend calls.

In accordance with another embodiment of the present disclosure, a system includes a data services module operable to receive a request for data from a client and based on the request, determine a workflow to process the request. The data services modules is also operable to based on the workflow, generate a plurality of backend calls and based on the plurality of backend calls, select one or more data sources from a plurality of data sources. The data service module is further operable to transmit one or more of the plurality of backend calls to the selected data sources and receive, from each of the selected data sources, a response to the plurality of backend calls. Additionally, the system includes the one or more data sources operable to receive, from the data services module the one or more of the plurality of backend calls and transmit, to the data services module, the response.

In accordance with yet another embodiment of the present disclosure, a computer readable non-transitory medium is encoded with logic, and the logic is operable, when executed on a processor to receive a request for data from a client and based on the request, determine a workflow to process the request. The logic is also operable to based on the workflow, generate a plurality of backend calls and based on the plurality of backend calls, select one or more data sources from a plurality of data sources. The logic is further operable to transmit one or more of the plurality of backend calls to the selected data sources and receive, from each the selected data sources, a response to the plurality of backend calls.

Technical advantages of particular embodiments of the present disclosure include performing appropriate protocol and/or format translation, transmitting requests to appropriate data sources, and combining multiple responses into a combined response. By so doing, particular embodiments, facilitate communication between clients and data sources. Particular embodiments may provide a common framework for application and data access, thereby standardizing data access components. Moreover, embodiments of the present disclosure may access federated databases using multi-step processes. Some embodiments also facilitate the construction of workflows through a visual programming model. As a consequence, parallel backend calls are simple to construct. In some embodiments, the compensation mechanism requires not customized and/or specialized programming. Thus, particular embodiments are able to access various backend providers and/or data sources, and provide an extensible and scalable framework that allows custom schema adapters, customer service providers and other similar customization. Particular embodiments allow for tracking support, and may use the toolset of Microsoft's .NET 3.0 workflow engine to create workflows. Additionally, particular embodiments, provide a built-in visibility check, and may enforce visibility checks at multiple levels: at the orchestration level, at each backend call, and at attribute levels. Moreover, particular embodiments may administer visibility policies from a single location for different backend data sources.

Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description taken in conjunction with the accompanying drawings, in which:

FIG. 4 is an example Graphical User Interface for retrieving and editing information associated with workflows, according to particular embodiments of the present disclosure.

DETAILED DESCRIPTION OF THE INVENTION

Figure 1:
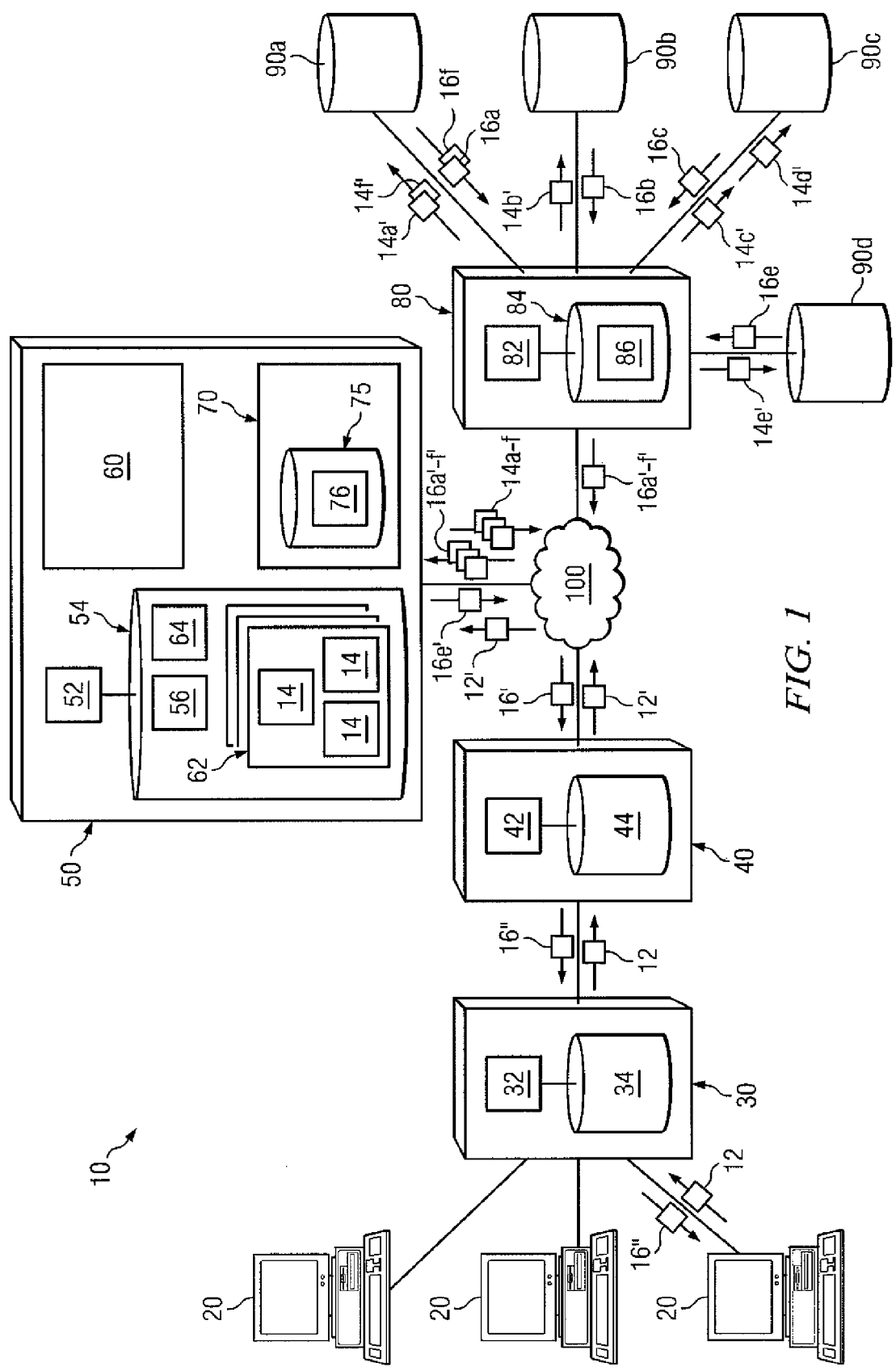
FIG. 1 illustrates a system in accordance with particular embodiments of the present disclosure, including clients, a data request handler, a data services module, an orchestration component, an adapter, data sources, and a network.

FIG. 1 illustrates a system 10 in accordance with certain embodiments of the present disclosure. System 10 comprises clients 20 that communicate with data request handler 40. Data services module 50 and orchestration component 60 facilitate the retrieval of information from data sources 90.

In general, system 10 is operable to process a request for data from clients 20 by orchestrating a sequence of backend calls in accordance with a workflow in order to retrieve data from one or more different data sources 90. To facilitate processing of the request, data request handler 40 transforms the request into a standard format. Data request handler 40 may transmit the request in a standard format to data services module 50. Orchestration component 60 may then select an appropriate workflow to facilitate further processing of the request. According to the workflow, orchestration component 60 communicates with data sources 90 to retrieve information in response to the request. Data source 90 transmits a response to orchestration component 60. Orchestration component 60 receives a plurality of responses associated with the plurality of operations in the workflow, and combines the plurality of responses into a combined response. Orchestration component 60 transmits the combined response to data request handler 40, which may translate the combined response into a format readable by the requesting client 20.

Clients 20 (each of which may be referred to individually as "client 20" or collectively as "clients 20") transmit request 12 to web module 30. Request 12 represents any form of data transmission, including information transmitted in an Internet Protocol packet, Ethernet frame, Asynchronous Transfer Mode cell, Frame Relay frame, and/or any other suitable mode of data communication. Request 12 may include a request to retrieve data, a request to store data, a request to change data, a request to delete data, and/or a request to process data in any suitable manner. Clients 20 may transmit request 12 in a particular format. For example, request 12 may be formatted in XML, HTML, X4mL, OASIS XACML, or any other suitable format.

In particular embodiments, clients 20 represent general or special-purpose computers operating software applications capable of performing the above-described operations. For example, clients 20 may include, but are not limited to, laptop computers, desktop computers, portable data assistants (PDAs), and/or portable media players. In some embodiments, client 20 comprises a general-purpose personal computer (PC), a Macintosh, a workstation, a Unix-based computer, a server computer, or any suitable processing device. Additionally, in particular embodiments, client 20 may include one or more processors operable to execute computer logic and/or software encoded on non-transitory tangible media that performs the described functionality. Client 20 may also include one or more computer input devices, such as a keyboard, trackball, or a mouse, and/or one or more Graphical User Interfaces (GUIs), through which a user may interact with the logic executing on the processor of client 20. In general, client 20 includes any appropriate combination of hardware, software, and/or encoded logic suitable to perform the described functionality. Additionally, clients 20 may be connected to or communicate with web module 30, data request handler 40, and/or data services module 50, directly or indirectly over network 100. Clients 20 may couple to network 100 through a dedicated wired or wireless connection, or may connect to network 100 only as needed to receive, transmit, or otherwise execute applications. Although FIG. 1 illustrates, for purposes of example, a particular number and type of clients 20, alternative embodiments of system 10 may include any appropriate number and type of clients 20, depending on the particular configuration of system 10.

Web module 30 represents a computer that transmits request 12 to data request handler 40. Prior to transmitting request 12, web module 30 may receive request 12 from clients 20 and/or generate request 12 in response to information received from client 20. For purposes of example, FIG. 1 illustrates web module 30 receiving request 12 from client 20 and transmitting request 12 to data request handler 40.

Data request handler 40 represents a computer that receives request 12 from client 20 and/or web module 30. Request 12 may be formatted in a particular format associated with the particular client 20 that transmitted request 12. Thus, because request 12 may be formatted in a variety of different formats, data request handler 40 may translate request 12 into a format readable by other components of system 10, referred to herein as request 12'. Data request handler 40 also receives response 16' from other components of system 10, and translates response 16' into a format readable by the particular requesting client 20, referred to herein as response 16".

Data services module 50 orchestrates the retrieval, storage, deletion, and/or other processing of data responsive to request 12' from one or more data sources 90 and while ensuring that the requesting client 20 performs only permitted actions and views only permitted data. Data responsive to request 12' may be located on different data sources 90. Thus, data service module 50 may determine how and from which data sources 90 data is retrieved. In order to orchestrate the retrieval of data, data service module 50 selects an appropriate workflow 62, selects and/or generates backend calls 14 based on the selected workflow 62, and transmits backend calls 14 to adapter 80. In general, workflow 62 governs how requests 12 are processed. In some embodiments, workflow 62 defines a particular sequence in which backend calls 14 are transmitted to adapter 80. A particular workflow 62 may be associated with a particular application that generates request 12, a particular user that generates request 12, particular information requested by request 12, and/or a particular format associated with request 12. Thus, depending on the format, source, user, information, and/or other relevant characteristic associated with request 12', data services module 50 selects a particular workflow 62 from memory 54 to determine how to process request 12'.

Workflow 62 includes one or more backend calls 14. Backend calls 14 represent predetermined procedures for processing data responsive to request 12.' In some embodiments, backend call 14 defines a particular operation, procedure, and/or process for responding to a particular request 12'. Backend call 14 may indicate a particular data source 90 that includes information responsive to request 12' and a particular manner of interacting with data source 90. Backend call 14 may indicate a particular protocol to use for communication with data source 90. Backend call 14 may specify a particular format readable by one or more data sources 90. For example, backend call 14 may define a procedure to retrieve a username from a customer relations relational database management system. Another backend call 14 may define a procedure to retrieve a customer's financial portfolio from a mainframe. In particular embodiments, some backend calls 14 are dependent on the results of other backend calls 14. For example, a first backend call 14 may define a procedure to retrieve a customer's profile from a customer relations relational database management system. The profile may indicate the types of accounts associated with the customer. Based on the results of the first backend call 14, a second backend call 14 may define a procedure to retrieve information associated with the accounts associated with the customer.

Data service module 50 may include sub-components that facilitate the processing of data responsive to request 16' and ensure that a requesting client 20 only performs permitted actions and/or views permitted data. In particular embodiments, data services module 50 comprises sub-components, such as orchestration component 60 and visibility component 70. Orchestration component 60 receives request 12', selects an appropriate workflow 62, transmits backend calls 14 to adapter 80, receives response 16', combines responses 16' into a combined response 16', and transmits the combined response 16' to data request handler 40 as discussed above.

Visibility component 70 regulates the types of actions that client 20 is permitted to perform within system 10, and may determine which aspects of response 16' a particular client 20 is permitted to view. Visibility component 70 includes memory 75, which stores one or more visibility policies 76. Visibility policy 76 includes rules that define the types of actions that client 20 is permitted to perform within system 10 and which aspects of response 16 client 20 is permitted to view. For example, visibility policy 76 may include a rule that indicates a financial advisor is permitted to retrieve data, but not permitted to write data. Thus, if a financial advisor transmits a request 12 that indicates a request to write data, visibility component 70 may prevent a backend call 14 that writes data from being transmitted to adapter 80.

Adapter 80 represents a computer that performs translation operations on backend calls 14 that facilitate communication between data services module 50 and data sources 90. For example, adapter 80 receives backend calls 14 from data service module 50 in a particular format. As discussed above, adapter 80 may receive backend call 14 in a standard format, and translate backend call 14 into a second format readable by a particular data source 90, referred to herein as backend call 14'. Similarly, adapter 80 receives a response 16 from data source 90, and translates response 16 into a standard format readable by other components of system 10, referred to herein as response 16'. Once received from data source 90 and translated into a standard format, adapter 80 transmits response 16' to data services module 50.

In some embodiments, web service module 30, data request handler 40, data service module 50, and adapter 80 represent a general-purpose PC, a Macintosh, a workstation, a Unix-based computer, a server computer, and/or any suitable processing device. Accordingly, web services module 30, data request handler 40, data services module 50, and adapter 80 may include one or more processors and/or memory to perform the above described functions. For example, as shown in FIG. 1, web services module 30 includes processor 32 and memory 34, data request handler 40 includes processor 42 and memory 44, data services module 50 includes processor 52 and memory 54, and adapter 80 includes processor 82 and memory 84.

Memory 34, 44, 54, and 84 each comprise any suitable arrangement of RAM, ROM, magnetic computer disk, CD-ROM, or other magnetic or optical storage media, or any other volatile or non-volatile memory devices that store one or more files, lists, tables, or other arrangements of information. Although FIG. 1 illustrates memory 34, 44, 54, and/or 84 as being internal to a respective component of system 10, it should be understood that memory 34, 44, 54, and/or 84 may be internal or external to the respective component, depending on particular implementations. Memory 34, 44, 54, and/or 84 may be separate from or integral to other memory devices to achieve any suitable arrangement of memory devices for use in system 10.

Memory 34, 44, 54, and/or 84 stores one or more of request 12, request 12', backend call 14, response 16, response 16', workflow 62, and/or visibility policy 76. As shown in FIG. 1, memory 34 stores logic 36, memory 44 stores logic 46, memory 54 stores logic 56, and memory 84 stores logic 86. Logic 36, 46, 56, and/or 86 generally comprise rules, algorithms, code, tables, and/or other suitable instructions for performing the operations as described herein.

Memory 34, 44, 54, and 84 are communicatively coupled to processor 32, 42, 52, and 82, respectively. Processor 32, 42, 52, and 82 are generally operable to execute logic 36, 46, 56, and 86, respectively to perform the operations as described herein. Processor 32, 42, 52, and 82 each comprise any suitable combination of hardware and/or software implemented in one or more modules to provide the described function or operation.

Data sources 90 represent data storage devices that store data responsive to request 12'. Data sources 90a, 90b, 90c, and 90d (each of which may be referred to individually as "data source 90" or collectively as "data sources 90") represent any device capable of storing, retrieving and/or processing any suitable form of electronic data. In particular embodiments, data source 90 represents a mainframe, a server, an electronic disk drive, a relational database management system, a personal computer, network attached storage, a storage area network, and/or any other electronic storage device to store data. In particular embodiments, a particular data source 90 may be different with respect to other data sources 90. For example, data source 90a may represent a disk drive in a personal computer storing a flat file, data source 90b may represent a relational database management system that stores tables of customer account information, and data source 90c may represent a storage area network that stores transaction history. Data source 90 transmits data in response to backend call 14 as response 16. Response 16 represents any form of data transmission, including information transmitted in an Internet Protocol packet, Ethernet frame, Asynchronous Transfer Mode cell, Frame Relay frame, and/or any other suitable mode of data communication. Response 16 may include data that client 20 requested, an acknowledgement that particular data was written and/or deleted, an error message, and/or any other data responsive to backend call 14' and/or backend call 14. Data source 90 may transmit response 16 in a particular format.

In order to facilitate communication among the various components of system 10, clients 20, web module 30, data request handler 40, data services module 50, adapter 80, and data sources 90 are communicatively coupled via one or more networks 100. Network 100 may represent any number and combination of wireline and/or wireless networks suitable for data transmission. Network 100 may, for example, communicate internet protocol packets, frame relay frames, asynchronous transfer mode cells, and/or other suitable information between network addresses. Network 100 may include one or more intranets, local area networks, metropolitan area networks, wide area networks, cellular networks, all or a portion of the Internet, and/or any other communication system or systems at one or more locations. Although FIG. 1 illustrates for purposes of example a single network 100, particular embodiments of system 10 may include any appropriate number and type of networks 100 that facilitate communication among one or more various components of system 10.

In an exemplary embodiment of operation, client 20 transmits request 12 to web module 30. Request 12 may include a request to retrieve data, a request to store data, a request to modify data, a request to delete data, and/or a request to process data in any suitable manner. As discussed above, clients 20 may transmit request 12 in a particular format. For example, request 12 may be formatted in XML, HTML, X4mL, OASIS XACML, or any other suitable format. In some embodiments, client 20 transmits request 12 to web module 30, which simply relays and/or retransmits request 12 to data request handler 40. In other embodiments, web module 30 generates request 12 based on input received from client 20. In such embodiments, web module 30 generates and transmits request 12 to data request handler 40 based on the input received. For example, web module 30 may represent an interactive web page, web-based input form, web service and/or any other suitable interactive application operating over network 100. Client 20 may input information into an interactive application, and based on the received input, web module 30 may generate request 12 and transmit request 12 to data request handler 40. For discussion purposes, it is assumed that client 20 transmits request 12 that requests a customer profile based on a customer identification number.

Whether generated by client 20 or web module 30, data request handler 40 receives request 12. Request 12 may be in a first format associated with a particular client 20. In order to facilitate processing by other components of system 10, data request handler 40 translates request 12 from a first format into a second format readable by other components of system 10. In particular embodiments, data request handler 40 translates request 12 into a canonical and/or standardized format, represented in FIG. 1 as request 12'. Once translated, data request handler 40 transmits request 12' to data services module 50. In particular embodiments, data request handler 40 transmits request 12' to orchestration component 60 within data services module 50. As discussed above, request 12' includes a particular requested operation and associated parameters. In the illustrated example, request 12' includes a request to retrieve a customer profile, with the customer identification number representing an associated parameter.

Once data services module 50 receives request 12', orchestration component 60 selects an appropriate workflow 62 to process request 12'. Orchestration component may select an appropriate workflow 62 based on a particular operation requested by request 12'. In this example, orchestration component selects a "customer profile" workflow 62 that includes backend calls 14 for retrieving particular data associated with a customer profile. In some embodiments, a particular workflow 62 may be associated with a particular application that generates request 12, and/or a particular format associated with request 12. Thus, depending on request 12', orchestration component 60 may select a particular workflow 62 to determine an appropriate manner in which to process request 12'.

Workflow 62 defines a manner to process request 12' by specifying a sequence of one or more backend calls 14. Backend calls 14 represent predetermined procedures that when performed in sequence, suitably respond to request 12'. In some embodiments, backend call 14 defines a particular operation, procedure, and/or process for responding to a particular request 12. Backend call 14 may indicate a particular data source 90 responsive to request 12' and/or a particular manner of interacting with data source 90.

Backend calls 14 specified in workflow 62 may be processed in parallel and/or in serial. For example, for parallel backend calls 14, orchestration component 60 may perform operations specified by each parallel backend call 14 substantially simultaneously. As a result, orchestration component 60 does not wait for a response from a particular data source 90 before performing operations for other backend calls 14. In some embodiments, backend calls 14 specified in workflow 62 are processed in serial. For example, backend calls 14 may be processed such that orchestration component 60 transmits a first backend call 14, waits for a response from a particular data source 90, and then transmits a second backend call 14. The results of one backend call 14 may be used as input to another backend call 14. In some embodiments, backend calls 14 may be transmitted conditionally. For example, a particular backend call 14 may be transmitted on the condition that particular data exists and/or matches certain criteria.

Prior to transmitting backend calls 14, orchestration component 60 may consult visibility component 70 to determine whether a requesting client 20 is permitted to perform the particular operations specified in workflow 62. In order to make an appropriate determination, visibility component 70 retrieves an appropriate visibility policy 76 from memory 75. Visibility policy 76 may be associated with a particular client 20, a particular application, a particular operation, a particular workflow 62, and/or any other relevant aspect of system 10. In particular embodiments, visibility component 70 determines call level policies and attribute level policies. For example, a call level policy might indicate that a particular client 20 may be permitted to retrieve data from data sources 90, but not write data to data sources 90. In some embodiments, a particular client 20 may not be permitted to retrieve information from particular data sources 90. As another example, an attribute level policy may indicate that client 20 may not be permitted to view certain portions of data retrieved from data source 90. For example, client 20 may retrieve a user profile from data source 90 that includes a home address, telephone number, occupation, and social security number. Visibility component 70 may restrict client 20 from viewing the social security number, for instance, while permitting client 20 to view the home address, telephone number, and occupation.

Once an appropriate workflow 62 is selected, orchestration component 60 transmits permitted backend calls 14 to adapter 80. In this particular example, request 12' requests a customer profile that includes as a parameter a customer identification number. Thus, the selected workflow 62 includes a sequence of backend calls 14 that determine how to retrieve a customer profile from data sources 90 based on a customer identification number. For example, the selected workflow 62 may include a serial backend call 14a to retrieve a customer name from a particular data source 90 based on the customer identification number. Accordingly, orchestration component 60 transmits backend call 14a to adapter 80. Adapter 80 transmits backend call 14a to an appropriate data source 90, shown in FIG. 1 as data source 90a. Data source 90a transmits response 16a, which includes the customer name. Once the customer name is received in response 16a, parallel backend calls 14b, 14c, and 14d are transmitted that request the customer work address, customer account number, and customer account history, respectively from relevant data sources 90 based on the customer name received in response 16a. Once the responsive data is received in responses 16b, 16c, and 16d from data sources 90, another serial backend call 14e is transmitted to log a record of the data retrieval in data source 90d. Data source 90d transmits an acknowledgement of the logged record in response 16e.

One aspect of system 10 may enable repetitive retrievals for similar information. For example, in particular embodiments, orchestration component 60 may perform looping or branching operations with respect to particular backend calls 14. For example, once a particular response 16 is received, orchestration component 60 may transmit another backend call 14 based on response 16. Thus, orchestration component 60 transmits a particular backend call 14 more than once. For example, in this example, backend call 14b may retrieve an account number of a customer, based on the customer name. If there are more than one account numbers, which may be indicated in response 16b, orchestration component 60 may transmit backend call 14l, which performs the same operation as backend call 14b and retrieves another customer account number from data source 90. The particular operation associated with backend call 14 may be repeated until all data responsive to the backend call 14 is processed. As a result, orchestration component 60 may perform looping and/or branching operations.

Because data sources 90 may represent different types of storage devices storing and/or communicating in different data formats and/or protocols, adapter 80 may perform translating functions with respect to backend calls 14. In some cases, adapter 80 may translate a format of backend call 14 to a format readable by a particular data source 90. As shown in FIG. 1, adapter 80 translates backend calls 14a, 14b, 14c, 14d, 14e, and 14f into backend calls 14a', 14b', 14c', 14d', 14e' and 14f', respectively. The translation of backend call 14 may include translating backend call 14 into a protocol in which adapter 80 interacts with a particular data source 90, translating backend call 14 into a format in which data in data source 90 is formatted, and/or translating any relevant data to facilitate communication with one or more data sources 90. Conversely, adapter 80 translates responses 16 from a format readable by the relevant data source 90 to a format readable by other components of system 10. In this particular example, adapter 80 translates responses 16a, 16b, 16c, 16d, 16e, and 16f into a format readable by data service module 50 and/or other components of system 10, shown in FIG. 1 as 16a', 16b', 16c', 16d', 16e', and 16f', respectively. Once received from data source 90 and translated into a standard format, adapter 80 transmits responses 16a', 16b', 16c', 16d', 16e', and 16f' in a standard format to orchestration component 60.

It should be noted that errors may occur during the processing of workflow 62. Because errors may occur, data service module 50 provides a manner of restoring data to a state prior to the to the initiation of workflow 62. This compensation may correct for errors that occur during the processing of workflow 62. In some embodiments, orchestration component 60 performs compensation with respect to particular backend calls 14. As an example, a particular backend call 14 may attempt to write data to a particular data source 90. Prior to writing data to a particular data source 90, orchestration component 60 stores status information 64. Status information 64 stores data indicating the current state of the particular data source 90. If an error results from other parallel backend calls 14 and/or subsequent backend calls 14, orchestration component 60 uses information stored in status information 64 to write, delete, and/or update data to rollback data source 90 to its state prior to the first backend call 14 operation. As a result, orchestration component 60 prevents corruption of data source 90 from errors in backend call 14 operations.

After receiving responses 16a, 16b, 16c, 16d, 16e, and 16f, orchestration component 60 combines the multiple received responses 16 into a combined response 16'. Response 16' may thus include all the data retrieved in accordance with workflow 62. Either prior to or subsequent to combining responses 16 into response 16', visibility component 70 may filter response 16'. As discussed above, filtering response 16' includes restricting client 20 from viewing certain data included in the combined response 16'. Visibility component 70 may delete, remove, and/or filter particular data according to policies defined in visibility policy 76. In the illustrated example, a particular client 20 may be prohibited by visibility policy 76 from viewing a customer's home address. Accordingly, visibility component 70 may restrict client 20 from viewing the customer's home address while permitting client 20 to view the customer's name, account number, and account history.

To suitably filter response 16', visibility component 70 may consult visibility policy 76. Visibility policy 76 may be based on OASIS XACML standards. Visibility policy 76 may define controls based on one or more factors, including, but not limited to the environment (such as, for example, a general classification of an application generating request 12), the source (such as, for example, the role of the user generating request 12), the resource (such as, for example, the particular type of data requested by request 12), and the action (such as, for example, get, find, write, read, and/or store). Visibility policy 76 may be configured according to input received from a user interface and communicated to data services module 50.

After filtering response 16', orchestration component 60 transmits response 16' to data request handler 40. As discussed above, data request handler 40 may translate response 16' into a response 16" that has a format readable by a particular client 20 and/or web module 30. Data request handler 40 subsequently transmits response 16" to web module 30 and/or client 20. In particular embodiments, client 20 displays information indicated in response 16" to a user operating client 20.

By performing orchestration of backend calls 14 specified in an appropriate workflow 62, system 10 enables clients 20 to transparently retrieve, store, delete, modify, and/or otherwise process data from multiple different data sources 90. Additionally, by performing appropriate protocol and/or format translation, transmitting backend calls 14 to appropriate data sources 90, and combining multiple responses 16 into a combined response 16', data services module 50 facilitates communication between clients 20 and data sources 90. As a result, system 10 may provide numerous operational benefits. System 10 may provide a common framework for application and data access, thereby standardizing data access components. Moreover, system 10 may access federated databases using multi-step processes. System 10 also facilitates the construction of workflows 62 through a visual programming model. As a consequence, parallel backend calls 14 are simple to construct. In some embodiments, the compensation mechanism requires not customized and/or specialized programming. System 10 is able to access various backend providers and/or data sources 90, and provides an extensible and scalable framework that allows custom schema adapters, customer service providers and other similar customization. Particular embodiments allow for tracking support, and may use the toolset of Microsoft's .NET 3.0 workflow engine to create workflows 62. System 10 provides a built-in visibility check, and may enforce visibility checks at multiple levels: at the orchestration level, at each backend call 14, and at attribute levels. Moreover, system 10 may administer visibility policies 76 from a single location for different backend data sources 90.

As a result, system 10 provides numerous operational benefits. Nonetheless, particular embodiments may provide some, none, or all of these operational benefits, and may provide additional operational benefits.

Modifications, additions, or omissions may be made to system 10 without departing from the scope of the invention. For example, in the illustrated embodiment, client 20, web module 30, data request handler 40, data services module 50, adapter 80, and data sources 90 are represented as different components of system 10. However, the functions of client 20, web module 30, data request handler 40, data services module 50, adapter 80, and data sources 90 may be performed by any suitable combination of one or more servers or other components at one or more locations. In the embodiment where the various components are servers, the servers may be public or private servers, and each server may be a virtual or physical server. The server may include one or more servers at the same or at remote locations. Also, client 20, web module 30, data request handler 40, data services module 50, adapter 80, and data sources 90 may include any suitable component that functions as a server. Additionally, system 10 may include any number of clients 20, web modules 30, data request handlers 40, data services module 50, adapters 80, and data sources 90. Any suitable logic may perform the functions of system 10 and the components within system 10.

Figure 2:
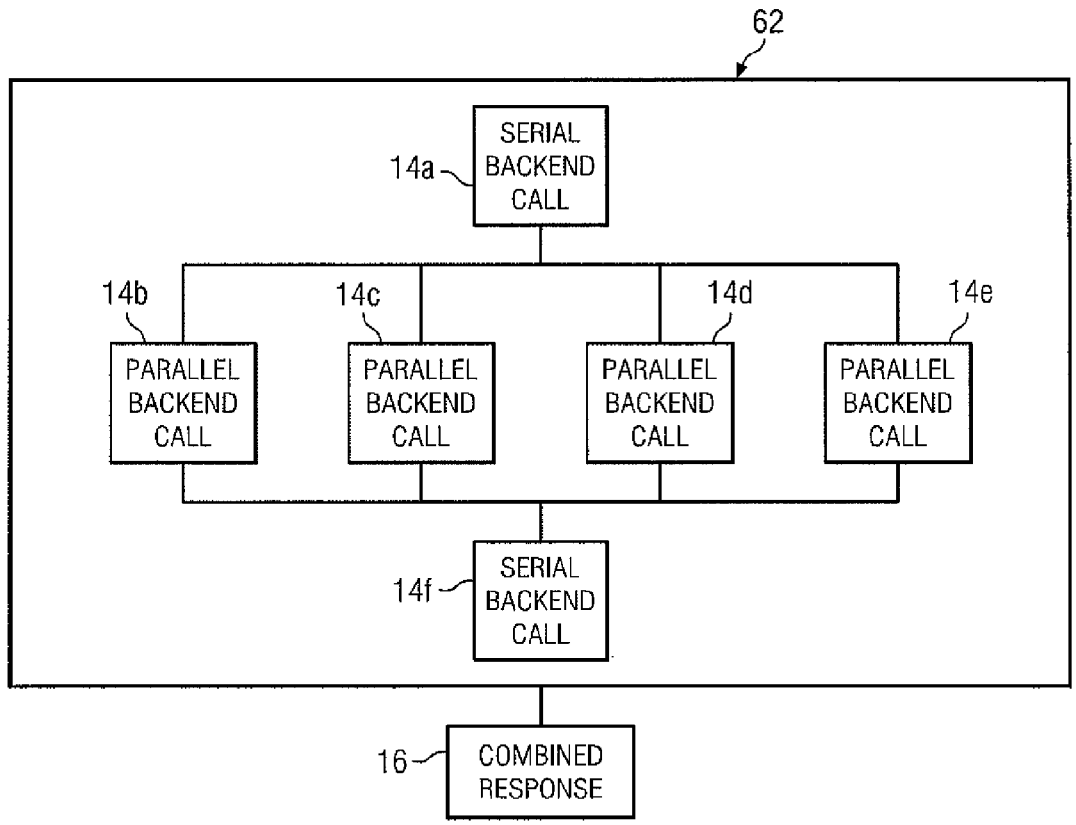
FIG. 2 illustrates a particular workflow in more detail, accordingly to particular embodiments of the present disclosure.

FIG. 2 illustrates an example operation of system 10 according to a particular embodiment. FIG. 2 includes a workflow 62, backend calls 14a-f, and response 16.

As shown in FIG. 2, workflow 62 includes backend calls 14a, 14b, 14c, 14e, and 14f. In particular embodiments, workflow 62 specifies a particular order in which backend calls 14a-f are transmitted to adapter 80 (not shown in FIG. 2). For example, workflow 62 includes serial backend calls 14a and 14f, and parallel backend calls 14b-e. Backend call 14a is transmitted first, and orchestration component 60 waits for response 16 from a relevant data source 90 before transmitting backend calls 14b-e. As a result, response 16 received in response to transmitting backend call 14a may be used as input for one or more of parallel calls 14b-e.

Once orchestration component 60 receives response 16 in response to backend call 14a, orchestration component 60 transmits backend calls 14b-e in parallel. For example, orchestration component 60 may perform operations specified by backend calls 14b-e substantially simultaneously. As a result, orchestration component 60 does not wait for a response from data source 90 for backend call 14b, for example, before performing operations for the remaining parallel backend calls 14c-e. Orchestration component 60 receives a response 16 in response to each of parallel backend calls 14b-e. Once orchestration component 60 receives response 16 for each of backend calls 14b-e, orchestration component 60 may transmit serial backend call 14f. Backend call 14f may use information provided by one or more responses 16 received in response to parallel backend calls 14b-e and/or serial backend call 14a. Subsequently, orchestration component 60 receives a response 16 in response to backend call 14f.

Once responses 16 are received for each of backend calls 14a-f, orchestration component 60 may combine responses 16 into a combined response 16. As discussed above with respect to FIG. 1, orchestration component 60 may translate response 16 into a format readable by client 20. Orchestration component 60 may then transmit the combined response 16 to an appropriate data request handler 40 and/or other appropriate component of system 10.

Although FIG. 2 illustrates an example orchestration component 60 transmitting six backend calls 14 in a particular sequence, it should be understood that particular embodiments of system 10 may include transmitting any number and combination of backend calls 14 in any sequence.

Figure 3:
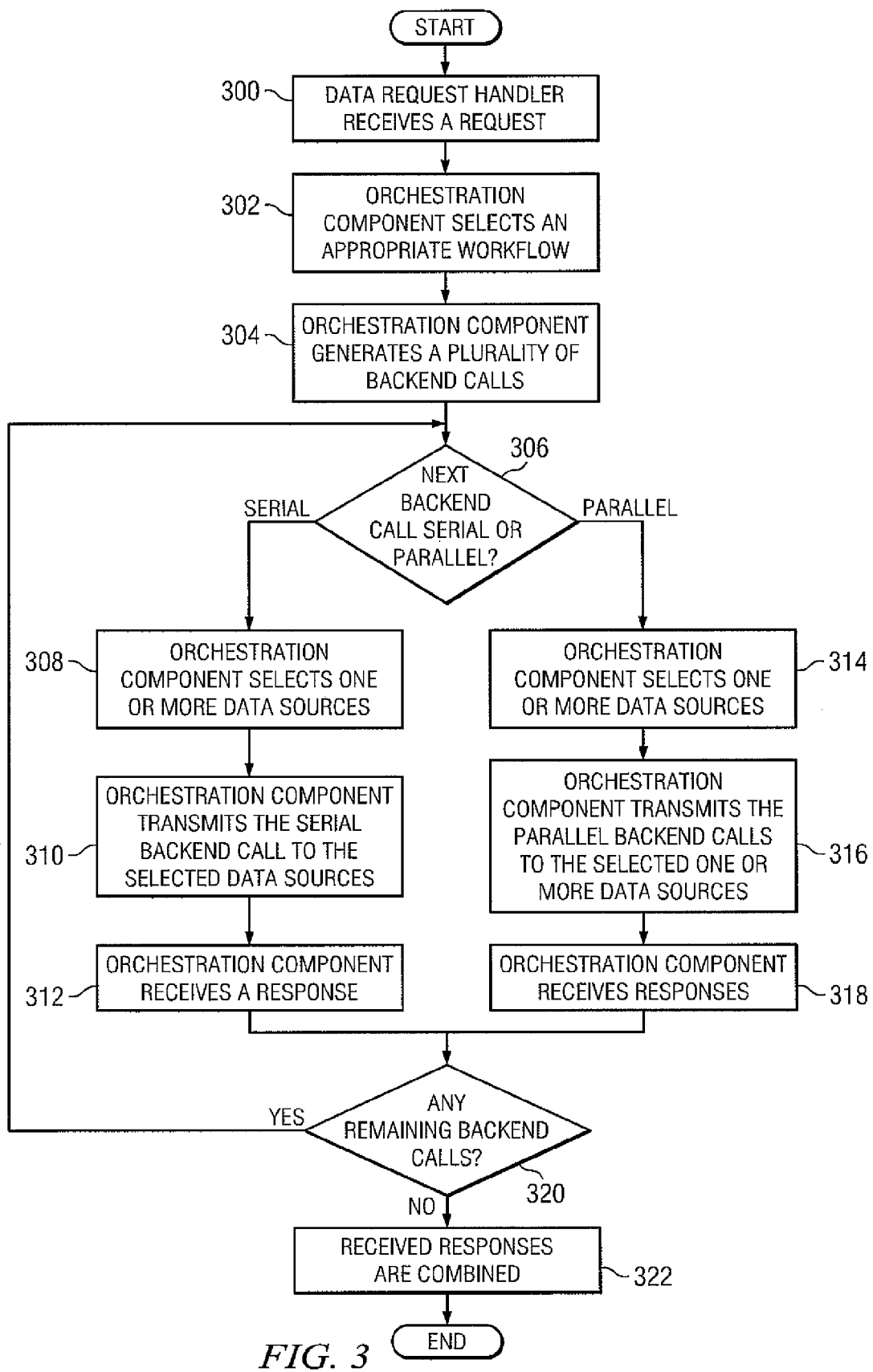
FIG. 3 is a flow chart illustrating a particular operation of the system of FIG. 1 in accordance with particular embodiments of the present disclosure.

FIG. 3 is a flow diagram illustrating an operation of system 10 in accordance with a particular embodiment. It should be understood that the flow diagram illustrated in FIG. 3 represents one example of an operation that may be performed in a particular embodiment of system 10. System 10 may perform other operations in accordance with particular embodiments as described in the present disclosure.

Operation, in the illustrated example, begins at step 300 with data request handler 40 receiving a request 12. In particular embodiments, data services module 50 may receive request 12 from data request handler 40. For example, client 20 may transmit request 12 to web modules 30. In some embodiments, web module 30 generates request 12 based on input received from client 20. Web module 30 transmits request 12 to data request handler 40. Data request handler 40, in some embodiments, translates request 12 from a first format into a second format readable by other components of system 10. In particular embodiments, data request handler 40 translates request 12 into a canonical and/or standardized format readable by other components of system 10. Once translated, data request handler 40 transmits request 12 to data services module 50. In particular embodiments, data request handler 40 transmits request 12 to orchestration component 60 within data services module 50.

At step 302, orchestration component 60 selects an appropriate workflow 62 to process request 12. Orchestration component 62 may select an appropriate workflow 62 stored in memory 54. A particular workflow 62 may be associated with a particular application that generates request 12, particular format associated with request 12, a particular operation requested by request 12, and/or any other appropriate aspect of system 10. For example, orchestration component 62 may select a "write customer information" workflow 62 to process a request 12 that requests to write a customer address to a customer profile. Thus, depending on request 12, orchestration component 60 may select a particular workflow 62 to determine an appropriate manner in which to process request 12. Workflow 62 includes one or more backend calls 14 that determine how orchestration component 60 processes request 12.

At step 304, orchestration component 60 receives and/or generates a plurality of backend calls 14 as indicated in the selected workflow 62. In particular embodiments, backend calls 14 represent predetermined procedures for responding to request 12. In some embodiments, backend call 14 defines a particular operation, procedure, and/or process for responding to a particular request 12. Backend call 14 may indicate a particular data source 90 responsive to request 12 and a particular manner of interacting with data source 90. Workflow 62 also indicates a particular sequence in which backend calls 14 are processed.

At step 306, orchestration component 60 determines whether the next backend call 14 in the sequence of backend calls 14 is a serial or parallel backend call 14. In particular embodiments, backend calls 14 may be processed serially and/or in parallel. Additionally, response 16 to a first backend call 14 may be used as input to a subsequent backend call 14. If orchestration component 60 determines the next backend call 14 is a serial backend call, operation proceeds to step 308. If orchestration component 60 determines the next backend call 14 is a parallel backend call, operation proceeds to step 314.

At step 308, orchestration component 60 selects one or more data sources 90 from a plurality of data sources 90 based on the serial backend calls 14. In particular embodiments, backend call 14 indicates a particular data source 90 that includes data requested by request 12 a particular protocol for interacting with data source 90. In some embodiments, backend call 14 specifies a particular format readable by one or more data sources 90.

At step 310, orchestration component 60 transmits the one or more generated backend calls 14 to the selected one or more data sources 90. Orchestration component 60 may transmit the one or more generated backend calls 14 to the selected one or more data sources 90 by transmitting the one or more backend calls 14 to adapter 80. Adapter 80 may perform appropriate translating and/or formatting operations as discussed above. Adapter 80 may subsequently transmit formatted and/or translated backend calls 14 to the selected one or more data sources 90.

At step 312, orchestration component 60 receives one or more responses 16 from data sources 90. Based on information indicated in backend call 14, data source 90 performs a particular operation, and transmits the results to orchestration component 60 by transmitting response 16. In particular embodiments, data source 90 transmits response 16 to adapter 80, which may perform translating and/or formatting operations as discussed above. Adapter 80 may then transmit response 16 to orchestration component 60. Operation proceeds by returning to step 306.

At step 314, orchestration component 60 selects one or more data sources 90 from a plurality of data sources 90 based on the backend calls 14 processed in parallel. In particular embodiments, backend call 14 indicates a particular data source 90 that includes data requested by request 12 a particular protocol for interacting with data source 90. In some embodiments, backend call 14 specifies a particular format readable by one or more data sources 90.

At step 316, orchestration component 60 transmits the parallel backend calls 14 to the selected one or more data sources 90. Orchestration component 60 may transmit the one or more generated backend calls 14 to the selected one or more data sources 90 by transmitting the one or more backend calls 14 to adapter 80 substantially simultaneously. Adapter 80 may perform appropriate translating and/or formatting operations as discussed above. Adapter 80 may subsequently transmit formatted and/or translated backend calls 14 to the selected one or more data sources 90.

At step 318, orchestration component 60 receives one or more responses 16 from data sources 90. Based on information indicated in backend call 14, data source 90 performs a particular operation, and transmits the results to orchestration component 60 by transmitting response 16. In particular embodiments, data source 90 transmits response 16 to adapter 80, which may perform translating and/or formatting operations as discussed above. Adapter 80 may then transmit response 16 to orchestration component 60.

At step 320, orchestration component 60 determines whether there are any remaining unprocessed backend calls 14. If yes, operation repeats by returning to step 306. If not, operation proceeds at step 324.

At step 324, orchestration component 60 combines the received responses 16' into a combined response 16'. In particular embodiments, orchestration component 60 combines multiple received responses 16' into a combined response 16'. For example, orchestration component 60 may combine responses 16' received in response to serial backend calls 14 and parallel backend calls 14 into a combined backend call 14. Once separate responses 16' are combined into a combined response 16', orchestration component 60 may transmit the combined response 16' to other component of system 10 for further processing as described above.

The steps illustrated in FIG. 3 may be combined, modified, or deleted where appropriate, and additional steps may also be added to those shown. Additionally, the steps may be performed in any suitable order without departing from the scope of the present disclosure.

Figure 4:
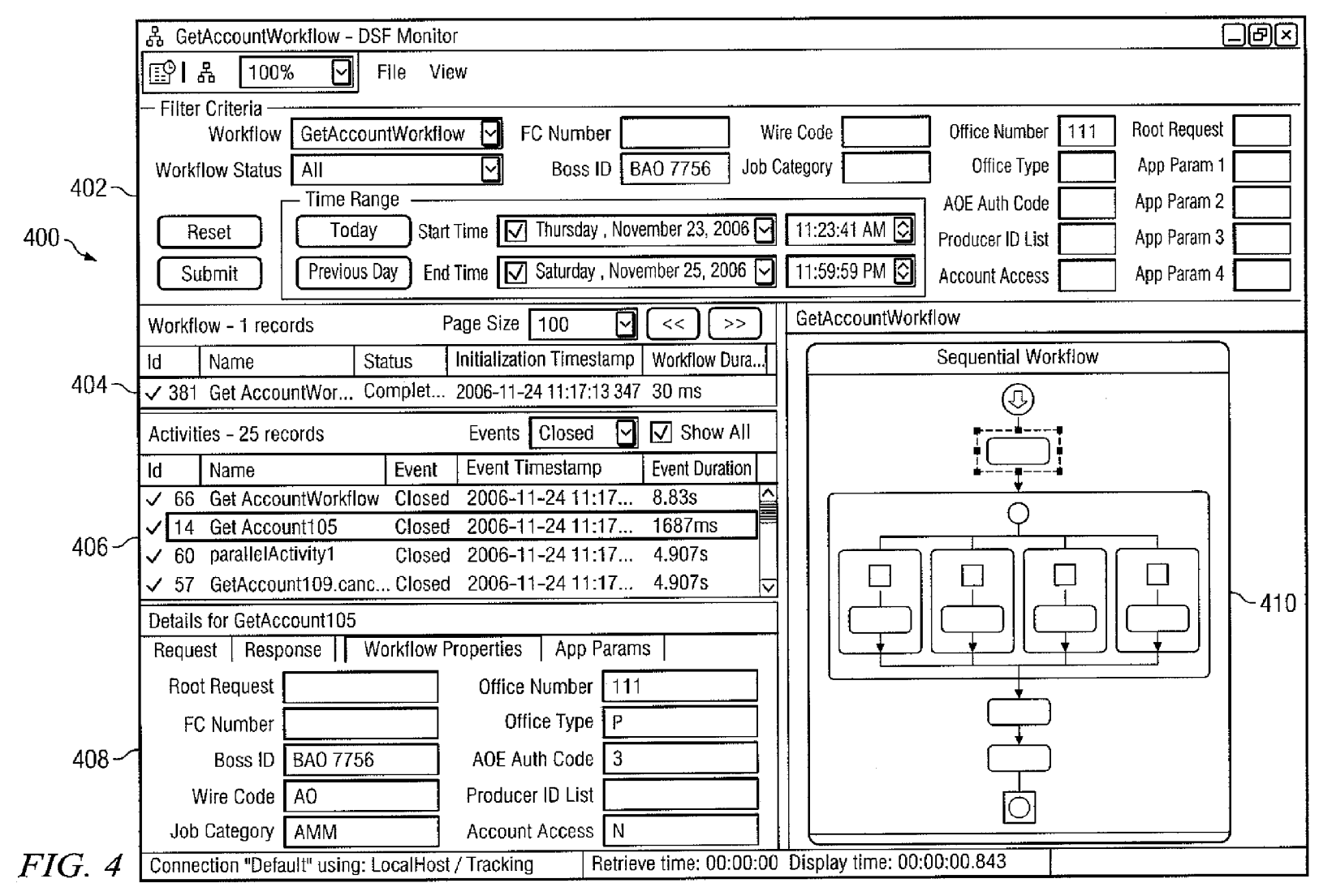

FIG. 4 illustrates an example Graphical User Interface ("GUI") 400 that an operator of system 10 may utilize to create, manage, and/or edit workflows 62. As shown in FIG. 4, GUI 400 includes search area 402, search results 404, backend call window 406, backend call editor 408, and workflow editor 410. In particular embodiments, a user may enter one or more search terms in search area 402 to retrieve particular workflows 62. Users may search based on workflow name, a workflow start time and/or end time, a work flow status, and/or any other relevant search criteria. Results from searches may appear in search results 404. As shown in FIG. 4, workflow 62 is displayed for the example search performed in search area 402. Backend call window 406 displays particular backend calls 14 included in workflow 62 selected in search results 404. A user may select a particular backend call 14 displayed in backend call window 406, and may edit the selected backend call 14 in backend call editor 408.

GUI 400 also includes workflow editor 410. Using workflow editor 410, a user may add, create, remove, modify, and/or specify a sequence for backend calls 14.

Workflow editor may comprise a window in which a user may manipulate graphical representations of backend calls 14. For example, GUI 400 may display a list of predefined backend calls 14, which a user may select and/or arrange to create a workflow 62. Backend calls 14 may be listed according to an operation performed by the respective backend call 14. For example, GUI 400 may list a "write data" backend call 14, "retrieve data" backend call 14, and/or a "delete data" backend call 14. Thus, GUI 400 may display graphical representations of predefined operations performed by data services module 50. Moreover, a user may also use arrows, lines, and/or other indicators to create or modify a sequence in which selected backend calls 14 are performed, and may associate backend calls 14 together to create parallel backend calls 14. Further, a user may specify that data included in a response 16 received in response to a particular backend call 14 is used as a parameter to a subsequent backend call 14.

Figure 5:
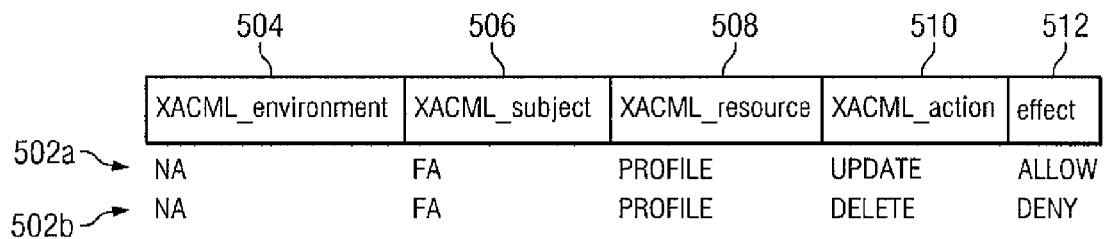
FIG. 5 represents an example visibility policy in accordance with a particular embodiment of the present disclosure.

FIG. 5 illustrates an example visibility policy 500 in accordance with a particular embodiment of system 10. As shown in FIG. 5, visibility policy 76 includes rules 502a and 502b. Rules 502a and 502b each include the following fields: environment field 504, subject field 506, resource field 508, action field 510, and effect field 512. Environment field 504 indicates a general classification of the calling application. Subject field 506 indicates a role of a user that visibility policy 76 applies to, such as, for example, financial advisor and/or customer agent. Resource field 508 indicates the type of resource being accessed, such as, for example, profile and/or asset. Action field 510 indicates the types of action the rule 502 applies to, such as, for example, update, delete, add, and retrieve. Effect field 512 indicates the policy applied by rule 502, such as, for example, allow, deny, and/or block silently.

In the example visibility policy 76, rule 502a indicates that financial advisors (as indicated in subject field 506) are allowed (as indicated in effect field 512) to update (as indicated in action field 510) a profile (as indicated in resource field 508). Rule 502b indicates that financial advisors (as indicated in subject field 506) are denied (as indicated in effect field 512) from deleting (as indicated in action field 510) a profile (as indicated in resource field 508). Although FIG. 5 illustrates for purposes of example a particular number and type of visibility policy 76, it should be understood that visibility policies 76 of any type supporting any number and/or type of rules may be created.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
   receiving a request for data from a client;
   based on the request, determining a workflow to process the request, the workflow defining a particular sequence for transmitting a plurality of backend calls, wherein the particular sequence comprises transmitting a first backend call to a first data source and then transmitting a second backend call to a second data source;
   based on the workflow, generating the plurality of backend calls;
   based on the plurality of backend calls, selecting one or more data sources from a plurality of data sources;
   transmitting one or more of the plurality of backend calls to the selected data sources in the particular sequence;
   receiving, from the first data source, a first response;
   determining from the first response one or more additional backend calls, wherein the one or more additional backend calls perform additional tasks identified in the first response to the first backend call;

based upon the one or more additional backend calls, selecting one or more additional data sources from the plurality of data sources;

transmitting the one or more additional backend calls to the one or more additional data sources;

receiving, from the one or more additional data sources, one or more additional responses; and receiving, from the second data source, a second response.

2. The method of claim 1, further comprising:

combining the first and second responses received from the first and second data sources into a combined response; and transmitting the combined response to the client.

3. The method of claim 1, wherein transmitting one or more of the plurality of backend calls to the selected data sources comprises transmitting each of the plurality of backend calls to the selected data sources in parallel.

4. The method of claim 1, wherein transmitting one or more of the plurality of backend calls to the selected data sources comprises transmitting the plurality of backend calls to the selected data sources serially.

5. The method of claim 1, wherein transmitting one or more of the plurality of backend calls to the selected data sources comprises transmitting selected ones of the plurality of backend calls to the selected data sources in parallel and transmitting selected ones of the plurality of backend calls to the selected data sources serially.

6. The method of claim 1, further comprising:

receiving the plurality of backend calls at an adapter, wherein each of the backend calls has a first format;

translating each of the plurality of backend calls into one of a plurality of second formats, wherein each of the plurality of second formats are readable by one or more of the selected data sources; and wherein transmitting one or more of the plurality of backend calls to the selected data sources comprises transmitting the one or more plurality of backend calls in one of the plurality of second formats to the selected data sources.

7. The method of claim 1, wherein receiving the first and second responses comprises receiving at an adapter, from the first and second data sources, a response, wherein each of the responses has one of a plurality of first formats; and further comprising:

translating each of the responses in one of the plurality of first formats into a second format, wherein the second format is readable by the client;

combining the responses in the second format into a combined response; and transmitting the combined response to the client.

8. A system, comprising:

a data services module configured to:

receive a request for data from a client;

based on the request, determine a workflow to process the request, the workflow defining a particular sequence for transmitting a plurality of backend calls, wherein the particular sequence comprises transmitting a first backend call to a first data source and then transmitting a second backend call to a second data source;

based on the workflow, generate a plurality of backend calls;

based on the plurality of backend calls, select one or more data sources from a plurality of data sources;

transmit one or more of the plurality of backend calls to the selected data sources in the particular sequence; and receive, from the first data source, a first response;

determine from the first response one or more additional backend calls, wherein the one or more additional backend calls perform additional tasks identified in the first response to the first backend call;

based upon the one or more additional backend calls, select one or more additional data sources from the plurality of data sources;

transmit the one or more additional backend calls to the one or more additional data sources;

receive, from the one or more additional data sources, one or more additional responses; and receiving, from the second data source, a second response; and the one or more data sources configured to:

receive, from the data services module the one or more of the plurality of backend calls; and transmit, to the data services module, the response.

9. The system of claim 8, wherein the data services module is configured to transmit one or more of the plurality of backend calls to the selected data sources by transmitting each of the plurality of backend calls to the selected data sources in parallel.

10. The system of claim 8, wherein the data services module is configured to transmit one or more of the plurality of backend calls to the selected data sources by transmitting the plurality of backend calls to the selected data sources serially.

11. The system of claim 8, wherein the data services module is configured to transmit one or more of the plurality of backend calls to the selected data sources by transmitting selected ones of the plurality of backend calls to the selected data sources in parallel and transmitting selected ones of the plurality of backend calls to the selected data sources serially.

12. The system of claim 8, further comprising:

an adapter configured to:

receive the plurality of backend calls at an adapter, wherein each of the backend calls has a first format;

translate each of the plurality of backend calls into one of a plurality of second formats, wherein each of the plurality of second formats are readable by one or more of the selected data sources; and transmit the one or more plurality of backend calls to the adapter in one of the plurality of second formats to the selected data sources; and wherein the data services module is configured to transmit one or more of the plurality of backend calls to the selected data sources by transmitting the one or more plurality of backend calls to the adapter.

13. The method of claim 8, further comprising:

an adapter configured to receive, from the first and second data sources the first and second responses, wherein each of the responses has one of a plurality of first formats; and translate each of the responses in one of the plurality of first formats into a second format, wherein the second format is readable by the client;

and wherein the data service module is configured to receive, from each of the selected data sources, a response to the plurality of backend calls by receiving the response in the second format from the adapter; and wherein the data services module is further configured to;

combine the responses in the second format into a combined response; and transmit the combined response to the client.

14. A computer readable non-transitory medium encoded with logic, the logic configured, when executed on a processor, to:
- receive a request for data from a client;
- based on the request, determine a workflow to process the request, the workflow defining a particular sequence for transmitting a plurality of backend calls, wherein the particular sequence comprises transmitting a first backend call to a first data source and then transmitting a second backend call to a second data source;
- based on the workflow, generate a plurality of backend calls;
- based on the plurality of backend calls, select one or more data sources from a plurality of data sources;
- transmit one or more of the plurality of backend calls to the selected data sources in the particular sequence; and
- receive, from the first data source, a first response;
- determine from the first response one or more additional backend calls, wherein the one or more additional backend calls perform additional tasks identified in the first response to the first backend call;
- based upon the one or more additional backend calls, select one or more additional data sources from the plurality of data sources;
- transmit the one or more additional backend calls to the one or more additional data sources;
- receive, from the one or more additional data sources, one or more additional responses; and
- receive, from the second data source, a second response.

15. The computer readable non-transitory medium of claim 14, wherein the logic is further configured to:
- combine the first and second responses received from the first and second data sources into a combined response; and
- transmit the combined response to the client.

16. The computer readable non-transitory medium of claim 14, wherein the logic is configured to transmit one or more of the plurality of backend calls to the selected data sources by transmitting each of the plurality of backend calls to the selected data sources in parallel.

17. The computer readable non-transitory medium of claim 14, wherein the logic is configured to transmit one or more of the plurality of backend calls to the selected data sources by transmitting the plurality of backend calls to the selected data sources serially.

18. The computer readable non-transitory medium of claim 14, wherein the logic is configured to transmit one or more of the plurality of backend calls to the selected data sources by transmitting selected ones of the plurality of backend calls to the selected data sources in parallel and transmitting selected ones of the plurality of backend calls to the selected data sources serially.

19. The computer readable non-transitory medium of claim 14, wherein the logic is further configured to:
- receive the plurality of backend calls, wherein each of the backend calls has a first format;
- translate each of the plurality of backend calls into one of a plurality of second formats, wherein each of the plurality of second formats are readable by one or more of the selected data sources; and
- wherein the logic is configured to transmit one or more of the plurality of backend calls to the selected data sources by transmitting the one or more plurality of backend calls in one of the plurality of second formats to the selected data sources.

20. The computer readable non-transitory medium of claim 14, wherein the logic is configured to receive the first and second responses by receiving, from the first and second data sources, a response, wherein each of the responses has one of a plurality of first formats; and wherein the logic is further configured to:
- translate each of the responses in one of the plurality of first formats into a second format, wherein the second format is readable by the client;
- combine the responses in the second format into a combined response; and
- transmit the combined response to the client.

* * * * *